Feb. 2, 1960  G. A. CROWTHER  2,923,466
VECTOR STABILIZER
Filed May 27, 1955  2 Sheets-Sheet 1

United States Patent Office 2,923,466
Patented Feb. 2, 1960

2,923,466

VECTOR STABILIZER

George A. Crowther, Manhasset, N.Y., assignor to Sperry Rand Corporation, a corporation of Delaware Application May 27, 1955, Serial No. 511,709

5 Claims. (Cl. 235—61.5)

This invention relates to a device for maintaining resultant vectorial quantities constant or stable and more particularly to a computing system which includes a plurality of interconnected integrators arranged in accordance with mathematical formulation to produce the components of a vector of constant resultant magnitude.

The computer has particular application to fire control systems which generate relative motion quantities for the purpose of establishing and correcting target speed and course angle and is therefore described in that context. But its utility is not confined to association with rate control mechanism. The computer will have application where it is desired to make constant or stabilize a vectorial quantity representing a resultant rate although the component rates are a function of position which is changing. In essence, its primary function is to fix the component vectors relative to each other so that the resultant vector as measured in its own coordinate system will be invariant.

When this vectorial quantity can be pre-selected and plotted in advance as to control the flight of a missile between two fixed points, no provision need be made for correcting the invariant vector. When, however, it is impossible to predetermine the invariant vector, there must be mechanism which will be capable of changing relatively the component vectors so as to alter the invariant vector and thus correct it. Accordingly, rate control units having observing and rate generating mechanism are employed in combination with the vector stabilizing computer which is adapted to receive these rates and establish a new vector. The rates may be said to be the component vectors and the relative motion vector the invariant vector when the computer is combined with fire control equipment. After the relative motion vector is correctly established, the computer holds the rates in a constant relationship until a different course or speed is observed.

One object of the invention therefore is to provide a vector stabilizing device.

Another object of the invention is to provide a vector stabilizer in combination with a rate control device.

Figure 1:
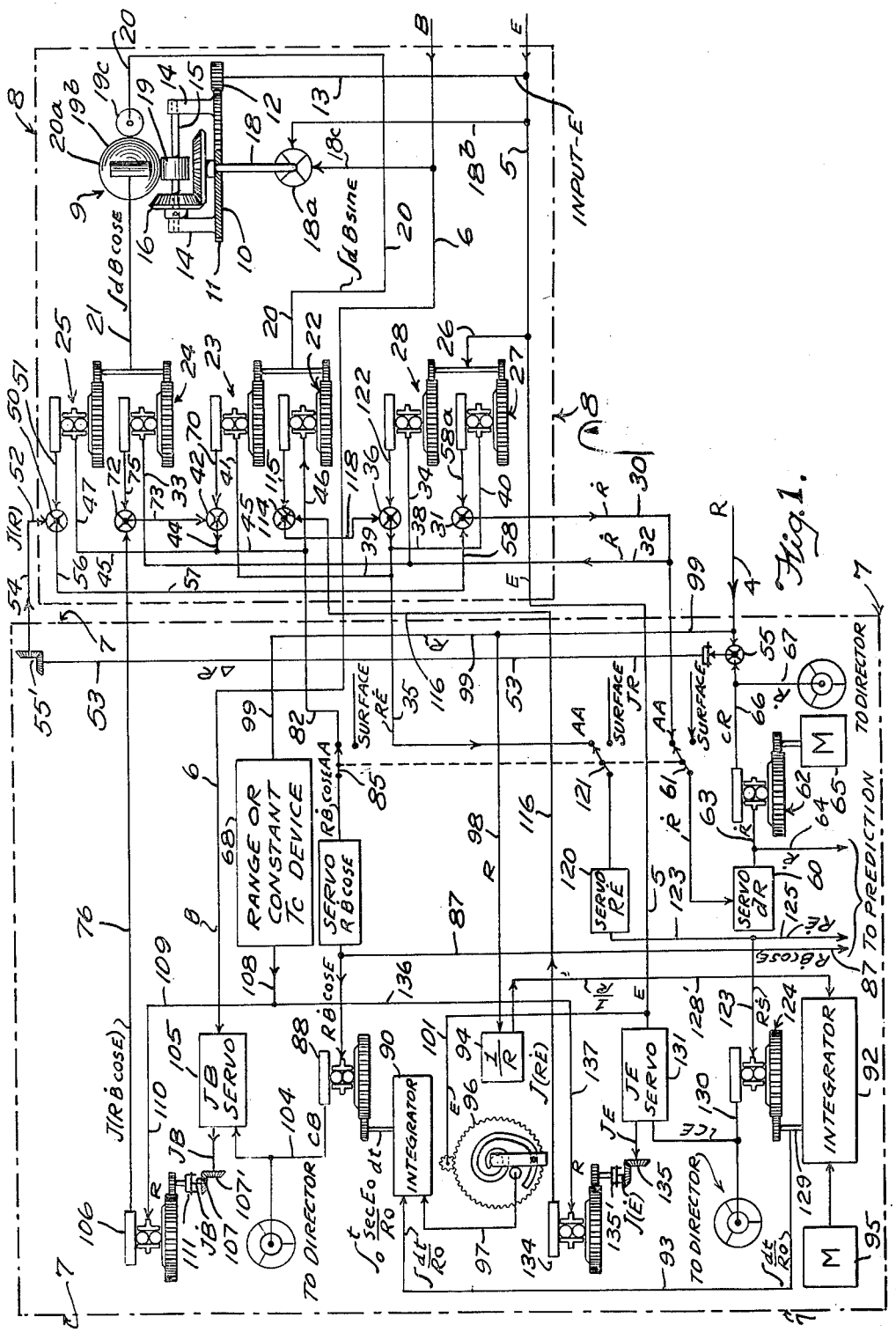
Figure 2:
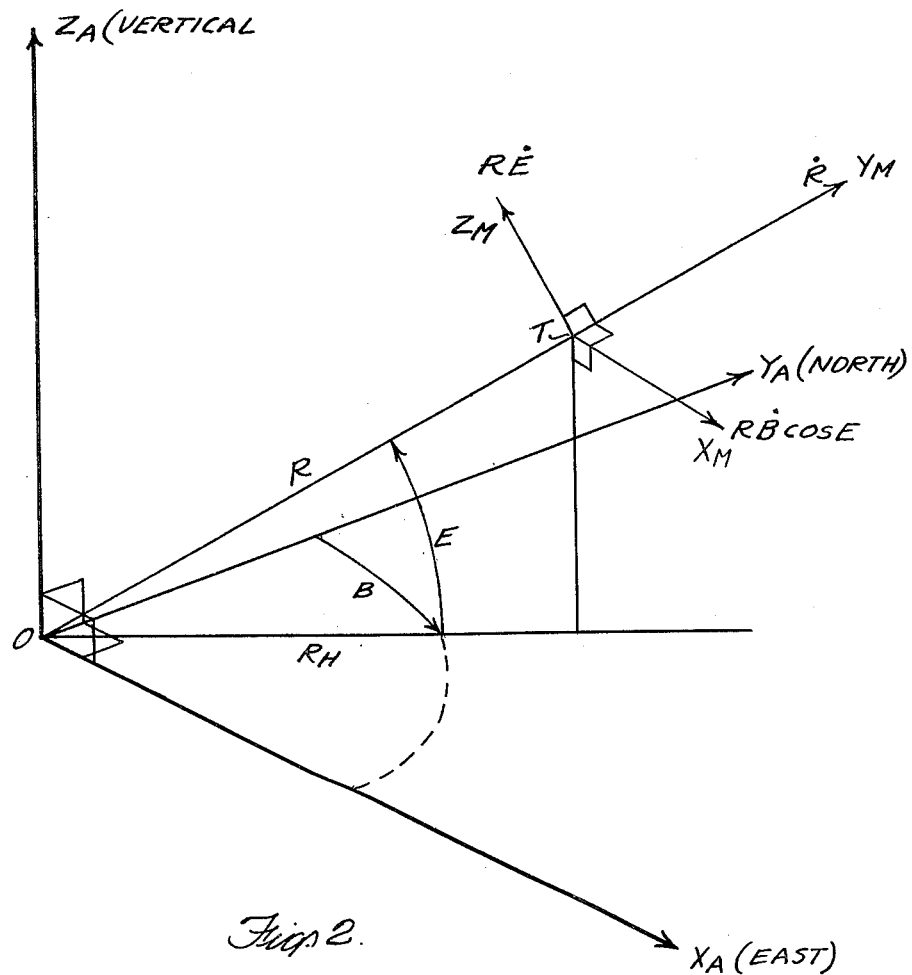

The particular nature of the invention as well as other objects and advantages thereof will appear more clearly from a description of the preferred embodiment as shown in the accompanying drawings in which Fig. 1 illustrates schematically the vector stabilizing and rate control sections of the computer and Fig. 2 is a diagram showing the quantities employed in the computer.

In controlling gun fire it is necessary to determine the target's motion in space with respect to direction and rate by means of observations from the gun platform. In the case of naval gun fire control the platform is usually the deck of a moving vessel and the observations are relative thereto and generally in the form of polar coordinates with the origin at the point of observation. The resulting relative motion vector is resolved into components along the line of sight and at right angles to the line of sight with the line of sight referenced to the earth coordinates. The line of sight makes an angle B from north in the horizontal earth plane and an angle E from the horizontal measured in the vertical plane. Assuming that both the observing platform and target maintain a constant speed and heading with respect to the observation reference coordinate system the component vectors having been established will vary with the following relationship to B, E and the range R:

Range rate vector at time $t$ (1)
$$(\dot{R})_t = (\dot{R})_0 + \int_0^t (R\dot{B} \cos E) \frac{d}{dt}\left[\int dB \cdot \cos E\right] dt + \int_0^t (R\dot{E})\frac{dE}{dt}dt + J(\dot{R})$$

where the correction item $J(\dot{R})$ is obtained by multiplying the quantity representing the difference between the computed range $cR$ and the observed range $R$ by a time constant of integration, the computed range being produced by integrating $(\dot{R})_t$, and $(\dot{R})_0$ is an initially set-in value.

Lateral deflection vector at time $t$ (2)
$$(R\dot{B} \cos E)_t = (R\dot{B} \cos E)_0 + \int_0^t (R\dot{E})\frac{d}{dt}\left[\int dB \cdot \sin E\right] dt - \int_0^t (\dot{R})\frac{d}{dt}\left[\int dB \cdot \cos E\right] dt + J(R\dot{B} \cos E)$$

where the correction item $J(R\dot{B} \cos E)$ is obtained by multiplying the quantity representing the difference between the computed bearing $cB$ and the observed bearing $B$ by the range $R$ and a time constant of integration, the computed bearing being obtained by integrating $(R\dot{B} \cos E)_t$ with respect to $$\int \frac{\sec E_0}{R_0} dt$$

and $(R\dot{B} \cos E)_0$ is a value for lateral deflection in the mechanism at the start of the solutions.

Vertical deflection vector at time $t$ (3)
$$(R\dot{E})_t = (R\dot{E})_0 - \int_0^t (\dot{R})\frac{dE}{dt}dt - \int_0^t (R\dot{B} \cos E)\frac{d}{dt}\left[\int dB \cdot \sin E\right] dt + J(R\dot{E})$$

where the correction item $J(R\dot{E})$ is obtained by multiplying the quantity representing the difference between the computed elevation $cE$ and the observed elevation $E$ by the range $R$ and a time constant of integration, the computed elevation being obtained by integrating $R\dot{E}$ with respect to $$\int \frac{dt}{R_0}$$

and $(R\dot{E})_0$ is initial vertical deflection.

Equations 1 to 3 may be derived in accordance with the principle of spherical trigonometry. The derivatives in the derivations are taken with respect to time.

$\bar{R}_0$, the observed relative position of the target with respect to the observing station, is given by spherical coordinates, R, B, E in a coordinate system oriented in a definite manner with respect to the earth ($x_A$-axis east, $y_A$-axis north and $z_A$-axis vertical) with the origin at the observing station.

Under the assumption that acceleration $$(\ddot{\bar{R}})_A$$

equals zero $$(\ddot{\bar{R}})_A$$

being observed relative target acceleration vector with respect to the earth or observation coordinate system $J\bar{R}$, the vector difference between the observed position and the generated position $\bar{R}_G$ approaches zero the generated position $\bar{R}_G$ being the position of the target as established by the three rates in the moving target coordinate system, generated elevation $R\dot{E}$, generated range R, generated bearing $R\dot{B}\cos E$, which are computed by the mechanism provided by this invention.

It is further evident that when, a short time after initiation of tracking, (4) $\qquad \bar{R}_O = \bar{R}_G - \bar{R}$ (5) $\qquad (\dot{\bar{R}}_O)_A = (\dot{\bar{R}}_G)_A$ where $$(\dot{\bar{R}}_O)_A$$

is the observed relative target velocity vector with respect to the observation reference coordinate system and $$(\dot{\bar{R}}_G)_A$$

is generated relative target velocity vector with respect to the observation reference coordinate system or (6) $\qquad \bar{V}_O = \bar{V}_G$ where $\bar{V}_O$ is observed velocity and $\bar{V}_G$ is generated velocity, which implies that $\bar{V}_G$ exists in the computer mechanism in the form of components in the moving coordinate system, slant range rate $\dot{R}$, elevation rate $R\dot{E}$ and bearing rate $R\dot{B}\cos E$.

It is desirable to refer the velocity vector $\bar{V}_G$ to a moving coordinate system M (see Fig. 2) with origin at the observed target position and oriented in a definite manner with respect to the observed line of sight, $y_M$ axis along observed line of sight in direction of increasing range, $x_M$ axis perpendicular to observed line of sight and parallel to the $X_A$, $Y_A$ plane in direction of increasing bearing angle B and $z_M$ axis perpendicular to observed line of sight in the vertical plane and in the direction of increasing angle E, elevation angle.

In the coordinate system M related to the line of sight, where $\bar{1}$ indicates unit vector.

(7) $\qquad \bar{R} = \bar{1}_{y_M} R$ where $\bar{1}_{y_M}$ is a unit vector in the positive direction of the $Y_M$ axis of the moving coordinate system (see Fig. 2).

In accordance with the Coriolis equation (8) $\qquad (\dot{\bar{R}})_A = (\dot{\bar{R}})_M + \bar{W}_{AM} x \bar{R}$ where $$(\dot{\bar{R}})_A$$

is observed relative target velocity vector with respect to the observation or earth reference coordinate system and $\bar{W}_{AM}$ is angular velocity vector of the moving coordinate system relative to the observation or earth reference coordinate system. All derivatives in this analysis are taken with respect to time, $dt$ being therefore implied.

Where (9) $\qquad (\dot{\bar{R}})_M = \bar{1}_{y_M} \dot{R}$

(10) $\bar{W}_{AM} = +\bar{1}_{z_A}[-\dot{B}] + \bar{1}_{x_M}[+\dot{E}]$ $\qquad = +\bar{1}_{x_M}[+\dot{B}] + \bar{1}_{y_M}[-\dot{B}\sin E]$ $\qquad + \bar{1}_{z_M}[-\dot{B}\cos E]$ where $\bar{1}_{z_A}$ is the unit vector in the positive direction of the positive direction of the $Z_A$ axis of the earth coordinate system, $\bar{1}_{x_M}$ is the unit vector in the positive direction of the $X_M$ axis of the moving target coordinate system and $\bar{1}_{z_M}$ is the unit vector in the positive direction of the $Z_M$ axis of the moving target coordinate system.

(11) $\bar{W}_{AM} x \bar{R} = +\bar{1}_{x_M}[+R\dot{B}\cos E] + \bar{1}_{z_M}[+R\dot{E}]$ hence

(12) $\bar{V} = +\bar{1}_{x_M}[+R\dot{B}\cos E] + \bar{1}_{y_M}[+\dot{R}] + \bar{1}_{z_M}[+R\dot{E}]$ so that the relative velocity components in the moving coordinate system M are:

(13) $\qquad V_{x_M} = +R\dot{B}\cos E = +R_H \dot{B}$ $R_H$ is horizontal component of range, $R\cos E$, which is the projection of range in the $Y_A$, $X_A$ plane (see Fig. 2).

(14) $\qquad V_{y_M} = +\dot{R}$

(15) $\qquad V_{z_M} = +R\dot{E}$ $$(\ddot{\bar{R}}_O)_A$$

is observed relative target acceleration vector with respect to the observation or earth coordinate system. Since it is desired that the rate correction factor $J\bar{R}$, which represents the difference between observed and generated position, approach zero when $$(\ddot{\bar{R}}_O)_A$$

or $$(\dot{\bar{V}})_A$$

is zero and since by the Coriolis relation

(16) $\qquad (\dot{\bar{V}})_A = (\dot{\bar{V}})_M + \bar{W}_{AM} x \bar{V}$ it follows that

(17) $\qquad (\dot{\bar{V}})_M = -\bar{W}_{AM} x \bar{V}$ where (18)

$(\dot{\bar{V}})_M = \bar{1}_{x_M}\left[\frac{d}{dt}(R\dot{B}\cos E)\right] + \bar{1}_{y_M}\left[\frac{d}{dt}\dot{R}\right] + \bar{1}_{z_M}\left[\frac{d}{dt}(R\dot{E})\right]$ (18a) $\bar{W}_{AM} x \bar{V} = \bar{1}_{x_M}[+\dot{B}\sin E(+R\dot{E}) - \dot{B}\cos E(+\dot{R})] + \bar{1}_{y_M}[+\dot{B}\cos E(+\cdot R\dot{B}\cos E) + \dot{E}(+R\dot{E})]$ $\qquad +\bar{1}_{z_M}[(-\dot{E})(+\dot{R}) - \dot{B}\sin E(+R\dot{B}\cos E)]$ or equating coefficients of unit vectors:

(19) $\frac{d}{dt}(+R\dot{B}\cos E) = +\dot{B}\sin E(+R\dot{E}) - \dot{B}\cos E(+\dot{R})$

(20) $\frac{d}{dt}(+\dot{R}) = +\dot{B}\cos E(+RB\cos E) + \dot{E}(+R\dot{E})$

(21) $\frac{d}{dt}(+R\dot{E}) = -\dot{E}(+\dot{R}) - \dot{B}\sin E(+R\dot{B}\cos E)$ These three simultaneous differential equations in the three unknowns, $R\dot{B}\cos E$ or $R_H\dot{B}$, $\dot{R}$ and $R\dot{E}$ may also be written in the integral form. For example Equation 19 in the integral form appears as follows:

(22)

$$\int_t^{t+\Delta t} \frac{d}{dt}(R\dot{B}\cos E)\cdot dt = \int_t^{t+\Delta t} d(R\dot{B}\cos E) = \Delta(R\dot{B}\cos E)$$

(23)

$$\Delta R\dot{B}\cos E = +\int_t^{t+\Delta t}\dot{B}\sin E(+R\dot{E})dt$$

$$-\int_t^{t+\Delta t}\dot{B}\cos E(+\dot{R})dt$$

(24)
$$\Delta R\dot{B} \cos E = +\int_t^{t+\Delta t} dB \cdot \sin E(+R\dot{E}) - \int_t^{t+\Delta t} dB \cdot \cos E(+\dot{R})$$

Similarly, Equations 20 and 21 may be placed in integral form. The quantities in Equation 24 shown in parenthesis, namely $+RE$ and $R$ represent integrator carriage settings while the remaining multiplying terms, $dB \cdot \sin E$ and $dB \cdot \cos E$, represent differential or infinitesimal displacements of the corresponding integrator discs in the vector stabilizing section described below.

Since

(25)
$$dB \cdot \sin E = \frac{dB}{dt} \sin E \cdot dt = d\int \frac{dB}{dt} \sin E \cdot dt = d\int dB \cdot \sin E$$

and

(26)
$$dB \cdot \cos E = \frac{dB}{dt} \cos E \cdot dt = d\int \frac{dB}{dt} \cos E \cdot dt = d\int dB \cdot \cos E$$

it is evident that the displacements of the discs are respectively

(27) $\int \frac{dB}{dt} \sin E \cdot dt$

(28) $\int \frac{dB}{dt} \cos E \cdot dt$ or

(29) $\int_t^{t+\Delta t} \frac{dB}{dt} \sin E \cdot dt = \Delta\left[\int dB \cdot \sin E\right]$

(30) $\int_t^{t+\Delta t} \frac{dB}{dt} \sin E \cdot dt = \Delta\left[\int dB \cdot \cos E\right]$

(31) $d(+R\dot{B}\cos E) = +(+R\dot{E})dB\cdot\sin E - (+\dot{R})dB\cdot\cos E$

(32) $d(+\dot{R}) + = (+R\dot{B}\cos E)dB\cdot\cos E + (+RE)dE$

(33) $d(+R\dot{E}) = -(+\dot{R})dE - (+R\dot{B}\cos E)dB\cdot\sin E$

(34) $d(+R\dot{B}\cos E) = +(+R\dot{E})d[\int dB\cdot\sin E] - (+\dot{R})d[\int dB\cdot\cos E]$

(35) $d(+\dot{R}) = +(+R\dot{B}\cos E)d[\int dB\cdot\cos E] + (+R\dot{E})dE$

(36) $d(+R\dot{E}) = -(+\dot{R})dE - (+R\dot{B}\cos E)d[\int dB\cdot\sin E]$

After integration with respect to the variables indicated from $t=0$ to $t$

(37)
$$(R\dot{B}\cos E)_t = (R\dot{B}\cos E)_0 + \int_0^t (R\dot{E})\frac{d}{dt}\left[\int dB\cdot\sin E\right]dt - \int_0^t (\dot{R})\frac{d}{dt}\left[\int dB\cdot\cos E\right]dt + J(R\dot{B}\cos E)$$

(38)
$$(\dot{R})_t = (\dot{R})_0 + \int_0^t (R\dot{B}\cos E)\frac{d}{dt}\left[\int dB\cdot\cos E\right]dt + \int_0^t (R\dot{E})\frac{dE}{dt}dt + J(\dot{R})$$

(39)
$$(R\dot{E})_t = (R\dot{E})_0 - \int_0^t (\dot{R})\frac{dE}{dt}dt - \int_0^t (R\dot{B}\cos E)\frac{d}{dt}\left[\int dB\cdot\sin E\right]dt + J(R\dot{E})$$

Referring to the drawing Fig. 1 therefor shows one embodiment of a rate control system adapted to mechanize the equations set forth above so as to generate solutions for the designated rates in the coordinate system shown in Fig. 2. The observed values for direct range R, elevation of the line of sight E above the horizontal earth plane and the bearing of the line of sight B with respect to north which are determined. Fig. 2 illustrates the two coordinate systems used in the derivations, namely the observation or earth reference system and the moving or target reference system related to the line of sight and in which the three coordinate rates are generated by the mechanism of this invention. The values R, E and B are servoed on shafts 4, 5 and 6, respectively. Bearing, range and elevation may be obtained as observed quantities in the usual manner as by a director in the case of bearing and elevation and by a range keeper in the case of range. The shaft 4 is connected to a differential and the shafts 5 and 6 are connected to correction rate servoes, these units being in the integration or rate control section 7, while shafts 5 and 6 are also connected into the rate correction factor or vector stabilizing section 8 where the corrected values for range rate and the two deflection rates are maintained.

A component integrator 9 is provided for resolving the rate of change of its input into two component rates of change $\int dB \sin E$ and $\int dB \cos E$. The integrator has a rotatable disc 10 having a peripheral gear 11 engaged by a pinion 12 on a shaft 13 which is driven by shaft 5 in accordance with the angular quantity E. The disc 10 carries a pair of standards 14 rotatably supporting a shaft 15 having a bevel gear 16 engaging a similar gear 17 on the end of shaft 18 which is driven by shaft 6 in accordance with the input quantity B through shaft 18c and differential 18a. The differential is also connected to input shaft 5 by means of shaft 18b whereby the angular quantity E is removed from shaft 18 to offset the planetary motion of the bevel gears while the disc 10 is being turned by shaft 5.

The shaft 15 also carries a roller 19 engaging a ball 19b suitably supported to make driving contact with rollers 19, 19c and 20a. The roller 19c is mounted on output shaft 20 and the movement imparted to the shaft 20 is in accordance with the product of B and sin E. The roller 20a is mounted on an output shaft 21 the movement of which may be said to represent the product of B and cos E. The shafts 20 and 21 are turned according to the generated increments of $\int dB \sin E$ and $\int dB \cos E$.

Shaft 20 is in driving connection with the discs of two variable speed devices or integrators 22 and 23 in the stabilizing section; shaft 21 is similarly connected to the discs of variable speed devices 24 and 25 and shaft 26 driven by shaft 5 is in driving connection with the discs of variable speed devices 27 and 28.

The six variable speed devices in section 8 maintain the relative relation of the vectorial rate components along and at right angles to the line of sight. It will be noted that the equations require that each of the corrected rates be integrated in the variable speed devices which are employed to compute the increments of the other two rates. By defining each rate in terms of the other two rates, the vectorial quantity which is a composite of the three rates becomes stabilized once the rates are finally established in the rate control section 7. The same rates are available for the prediction section of the director system where advance position is computed on the basis of the stabilized vector.

As shown below the corrected value for range rate $dR$ is represented on spider shaft 30 of differential 31. Rate shaft 32 is in driven connection with shaft 30 and is employed to feed the range rate to the ball carriages of the vertical deflection integrator 28 and the lateral deflection integrator 24. Carriage shafts 33 and 34 connect rate shaft 32 to the ball carriages of the integrators 24 and 28, respectively.

Differential shaft 35 of differential 36 is similarly driven in accordance with the corrected value for vertical deflection, $R\dot{E}$, and is connected to the carriages of the range rate integrator 27 and the lateral deflection integrator 23 by means of vertical rate deflection shafts 38 and 39 which are operatively connected to carriage shafts 40 and 41, respectively.

Similarly the output of differential 42 is connected to the ball carriages of vertical deflection integrator 22 and range rate integrator 25 through spider shaft 44, horizontal deflection shaft 45 and carriage shafts 46 and 47, respectively.

It will now be explained how the range rate $\dot{R}$, the vertical deflection rate $R\dot{E}$ and the horizontal deflection rate $R\dot{B}$ cos $E$ are corrected and introduced to output differential 31, differential 36 and differential 42, respectively.

In accordance with Formula 1, integrator 25 integrates $R\dot{B}$ cos $E$ with respect to $\int dB$ cos $E$ and the integrated solution is placed into one side of differential 50 by means of roller shaft 51. The correction factor $J(\dot{R})$ is placed into the other side of the differential 50 by means of range rate correction shaft 52 which is connected to differential 55 through shafts 53 and 54. Output shaft 56 of differential 50 feeds its output to one input side of differential 31 through shafts 57 and 58. Roller shaft 58ª of integrator 27 feeds the integral for $R\dot{E}$ with respect to $\dot{E}$ into the other side of differential 31. The output shaft 30 of differential 31 drives rate shaft 32 and the $\dot{R}$ servo 60 through switch 61. Range rate is servoed to the ball carriage of integrator 62 by means of shaft 63 and to the prediction section of the director system (not shown) for the determination of advance range on shaft 64 which is in gear connection with shaft 63.

The disc of integrator 62 is driven at uniform speed by a motor 65 so that the range rate may be integrated with respect to time and an increment of present range is placed in roller shaft 66 from which it may be fed to the director by means of shaft 67 and to the side of differential 55 opposite to that in which the observed range is placed. Differential 55 compares the computed range $cR$ with the observed direct range $R$ and the resulting increment $\Delta R$ is introduced to the differential 50 as explained above. Conversion from the linear quantity $\Delta R$ to the rate $J(\dot{R})$ is effected by the conversion gears 55' which establish the driving ratio between shafts 53 and 54. The quantity appearing on the output shaft 54 is then the mechanized equivalent of the correction factor $J(\dot{R})$.

As required by Formula 2 integrator 23 integrates $R\dot{E}$ with respect to $\int dB$ sin $E$ and roller shaft 70 of that device turns one side of differential 42. Into the other side of differential 42 is fed the output of differential 72 by spider shaft 73. The variable speed device 24 is adapted to integrate $\dot{R}$ with respect to $\int dB$ cos $E$. Its roller shaft 75 places the integrated solution in one side of differential 72. As described below the correction item $J(R\dot{B}$ cos $E)$ is fed to the other side of the differential 72 on shaft 76. The differential output on shaft 73 represents the difference between the two quantities placed in differential 72.

The correction item $J(R\dot{B}$ cos $E)$ is computed in the rate control section 7. Spider shaft 44 of differential 42 is in driven connection with shaft 45. Shaft 82 is operatively driven by shaft 45 and introduces $R\dot{B}$ cos $E$ to a servo 84 through switch 85. The servo output is employed to position the ball carriage of variable speed device 88. Shaft 87 driven by the servo 84 feeds the generated lateral deflection quantity $R\dot{B}$ cos $E$ to the prediction section of the director. The disc of the device 88 is driven by the mechanical output of integrator 90 into which is placed the output of integrator 92 on shaft 93. The outputs of $1/R$ unit 94 and time motor 95 are fed to the integrator 92 whose output represents the quantity $$\int \frac{dt}{R_0}$$

on shaft 93. A secant cam 96 is also connected into the integrator 90 by means of shaft 97. Shaft 101 connects the E input shaft 5 to the secant cam 96. Observed value $R$ is brought to the $1/R$ unit 94 by shafts 98 and 99.

Roller shaft 104 of the integrator 88 feeds the integrated output representing the computed bearing $cB$ to the JB servo 105 which is also connected to shaft 6 wherein a comparison of the computed and observed angular quantities can be effected and the differential quantity JB is converted to the rate, $\dot{J}\dot{B}$, as a time constant for multiplier 106, by means of conversion gears 107', being introduced to the multiplier by servo shaft 107 and clutch 111. The other input for multiplier 106 is provided by range device 68 which is connected to shaft 4 by means of shaft 99. Device 68 is thus enabled to place in the multiplier 106 the observed value of range by means of shafts 108, 109 and 110, or it may be set to produce a constant time constant which will be coincident with range at some designated value. Hence the output of multiplier 106 on shaft 76 represents the correction factor for horizontal deflection rate $J(R\dot{B}$ cos $E)$, which is placed into one side of the differential 72, as explained above. The roller shaft 104 is also connected to other sections of the director requiring the computed target bearing.

It is noted that the output of JB servo 105 is multiplied by $R$ rather than $R_h$ (i.e. $R$ cos $E$). This causes the effective $Tc$ to vary as secant $E$. If the range drive to the integrator 88 and multiplier 106 were fixed at some quantity or if these units were removed and suitable gear ratios chosen, the control time constant could also vary as range varies. This condition is called constant sigma.

In the mechanization of Formula 3 the quantity $R\dot{B}$ cos $E$ as represented by the position of the ball carriage of the integrator 22 is integrated with respect to $\int dB$ sin $E$ as represented by the rotation of its disc. The integrated solution is placed in differential 114 by roller shaft 115 which is driven by the roller of integrator 22. The correction factor $J(R\dot{E})$ is also introduced to the differential 114 by means of shaft 116 as explained below.

The combined output of differential 114 is represented on shaft 118 which connects the output of that differential to an input side of differential 36. The other input for the differential 36 is placed therein by roller shaft 122 of the variable speed device 28 which integrates $\dot{R}$ with respect to E.

The shaft 35 is driven by the output of differential 36, and vertical deflection rate $R\dot{E}$, including any initial value for vertical deflection $(R\dot{E})_0$ that is present on the shaft 35, is introduced into the $R\dot{E}$ servo 120 through the switch 121. Servo output shaft 123 positions the ball carriage of integrator 124 and drives the shaft 125 which is connected into the prediction multiplier section of the director. The disc of the integrator 124 is driven by the output of integrator 92 by means of shaft 129. The $1/R$ unit 94 is connected to one side of the integrator 92 by means of shaft 128'. As previously mentioned, the constant time motor 95 is connected to the integrator 92. Accordingly the integrator 124 is adapted to integrate $R\dot{E}$ with respect to $$\int \frac{dt}{R_0}$$

to yield a quantity representing a computed increment of elevation on the roller shaft 130 which is connected to the JE servo 131 and other sections of the director as indicated in the figure. Shaft 5 is also connected to the servo 131 and the algebraically combined angular quantity is converted to a rate correction factor, $J(\dot{E})$, by conversion gears 135 and is placed into multiplier 134 through clutch 135'. A second input R for the multiplier 134 is introduced by the range device 99' on shafts 108, 136 and 137. The multiplier output on shaft 116 representing the correction factor $J(R\dot{E})$ is fed back to the differential 114 and the inclusion of this factor in the output of differential 36 is accordingly effected.

The rate control system that is described is a mechanization designed to effect anti-aircraft solutions. The switches 61, 85 and 121 are positioned for automatically making these solutions. It is contemplated that the rate control equipment for surface solutions is entirely separate and may be provided as by range keepers when the switches are thrown to "surface" as indicated in the drawings. The vector stabilizing device in section 8 may operate independently of either type of rate control in the event the individual rates are known.

While a preferred embodiment of the invention has been shown and described, it will be understood that it may be embodied in other forms and that various changes may be made in structural details without departing from its principles as defined in the appended claims.

What is claimed is:

1. A vector stabilizing device comprising a vector stabilizing section having shafts settable in accordance with the range rate correction item, $J(\dot{R})$, the lateral deflection correction item, $J(R\dot{B} \cos E)$ and the vertical deflection correction item, $(JR\dot{E})$, respectively, means connected to the $J(\dot{R})$ shaft for solving the integral relation $$+\int_0^t (R\dot{B} \cos E)\frac{d}{dt}\left[\int dB\cdot\cos E\right]dt+\int_0^t (R\dot{E})\frac{dE}{dt}dt$$

to derive range rate $\dot{R}$, means connected to the $J(R\dot{E})$ shaft for solving the integral relation $$+\int_0^t (R\dot{E})\frac{d}{dt}\left[\int dB\cdot\sin E\right]dt-\int_0^t (\dot{R})\frac{d}{dt}\left[\int dB\cdot\cos E\right]dt$$

to derive lateral deflection rate $R\dot{B} \cos E$ and means connected to the $J(R\dot{B} \cos E)$ shaft for solving the integral relation $$-\int_0^t (\dot{R})\frac{dE}{dt}dt-\int_0^t (R\dot{B} \cos E)\frac{d}{dt}\left[\int dB\cdot\sin E\right]dt$$

to derive vertical deflection $R\dot{E}$ where the quantities ·R, B and E represent range, bearing and elevation respectively.

2. A control system comprising a rate control section for computing correction components of relative target motion along and at right angles to the line of sight established between an observation platform and a target, a component rate generating means connected to said rate control section to receive said correction increments and comprising a plurality of integrators arranged to generate continuously range rate $(\dot{R})$, lateral deflection rate $(R\dot{B} \cos E)$ and vertical deflection rate $(R\dot{E})$ in accordance with the formulations:

$$+\int_0^t (R\dot{B} \cos E)\frac{d}{dt}\left[\int dB\cdot\cos E\right]dt+\int_0^t (R\dot{E})\frac{dE}{dt}dt$$

$$+\int_0^t (R\dot{E})\frac{d}{dt}\left[\int dB\cdot\sin E\right]dt-\int_0^t (\dot{R})\frac{d}{dt}\int dB\cdot\cos E\, dt$$

$$-\int_0^t (\dot{R})\frac{dE}{dt}dt-\int_0^t (R\dot{B} \cos E)\frac{d}{dt}\left[\int dB\cdot\sin E\right]dt$$

means for introducing observed target bearing B and observed target elevation E to said rate control section and said vector stabilizer and means for introducing observed target range R to said rate control section.

3. A control system for fire control apparatus comprising a pair of variable speed devices for computing increments of range rate, a pair of variable speed devices for computing increments of horizontal deflection rate, and a pair of variable speed devices for computing increments of vertical deflection rate, rate control means for generating a correction factor for each of the respective rates, means for combining the output of one of each pair of variable speed devices with the appropriate correction factor and totalling the combined quantity with the output of the other variable speed device, means for introducing the totaled quantity for each pair of variable speed devices to one of the variable speed devices in each of the other pairs of variable speed devices and to said rate control means, a component integrator, means for introducing quantities representing observed target bearing and observed target elevation into said component integrator, means for introducing one output of the component integrator to two variable speed devices, means for introducing observed target elevation to the remaining two variable speed devices and means for separately introducing quantities representing observed target range, observed target bearing and observed target elevation to said rate control means.

4. A control system for fire control apparatus comprising an instrument for resolving the rate of change of one of its inputs into two integrated component rates of change, means for introducing observed target bearing and observed target elevation into said instrument, six variable speed devices, said devices having a disc, ball carriage and roller output, means for positioning the ball carriage of the first device in accordance with the output of the third device and means for driving the disc of said first device in accordance with one component output of said instrument, means for positioning the ball carriage of the second device in accordance with the output of the sixth device and means for driving the disc of said second device in accordance with said one component output of said instrument, means for positioning the ball carriage of the third device in accordance with the output of the fifth device and means for driving the disc of said third device in accordance with the other component output of said instrument, means for positioning the ball carriage of the fourth device in accordance with the output of the third device and means for driving the disc of the fourth device in accordance with said other component output of said instrument, means for positioning the ball carriage of the fifth device in accordance with the output of the sixth device and means for driving the disc of the fifth device in accordance with the value representing observed target elevation, means for positioning the ball carriage of the sixth device in accordance with the output of the fifth device and means for driving the disc of the sixth device in accordance with the value representing observed target elevation, a rate control system connected to receive the output of the third, fifth and sixth devices, means for introducing quantities representing observed range, observed elevation and observed bearing into said rate control system, said system being adapted to derive computed values for range, elevation and bearing from the outputs of said third, fifth and sixth devices, compare the said computed values with the corresponding observed quantities and determine range rate, horizontal and vertical deflection correction factors therefrom, means for combining said correction factors, respectively, with the outputs of said first, second and fourth devices and means for combining the outputs of said first, second and fourth devices with the outputs of the sixth, third and fifth devices, respectively.

5. A device for determining component rates in a moving target coordinate system having three mutually perpendicular axes comprising means for deriving each of said component rates from the other two component rates, a sine-cosine component resolving and integrating device, means for introducing to said device observed target bearing and observed target elevation, said quantities being related to an earth coordinate system having its origin at the point of observation, said device being connected on its output side to the component rate deriving means, combining devices connected to receive each of said generated component vectors, rate control means responsive to said combining devices for converting each of said generated component vectors to rate correction factors, said combining devices being also connected to receive said rate correction factors, means for introducing target elevation measured in said earth coordinate system to said rate control means whereby said combining devices are adapted to yield accurate vector components when the correction factors are nulled.

References Cited in the file of this patent

UNITED STATES PATENTS

| | | |
|---|---|---|
| 2,702,667 | Ford | Feb. 22, 1955 |
| 2,715,497 | Droz et al. | Aug. 16, 1955 |

FOREIGN PATENTS

| | | |
|---|---|---|
| 706,512 | Great Britain | Mar. 31, 1954 |